(12) United States Patent
Lee

(10) Patent No.: US 8,677,573 B2
(45) Date of Patent: Mar. 25, 2014

(54) TWO STAGE SERVICEABLE SAFETY CLIP

(75) Inventor: Yun Shin Lee, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 174 days.

(21) Appl. No.: 13/071,000

(22) Filed: Mar. 24, 2011

(65) Prior Publication Data
US 2012/0240363 A1 Sep. 27, 2012

(51) Int. Cl.
*B60R 13/02* (2006.01)

(52) U.S. Cl.
USPC ............... 24/297; 24/289; 24/458; 24/588.11

(58) Field of Classification Search
USPC .............. 24/289, 297, 458, 588.11; 296/39.1, 296/146.7, 191, 608, 214
See application file for complete search history.

(56) References Cited

U.S. PATENT DOCUMENTS

| | | | | |
|---|---|---|---|---|
| 4,176,428 A * | 12/1979 | Kimura | ............................ | 24/326 |
| 4,405,272 A * | 9/1983 | Wollar | ............................ | 411/41 |
| 4,648,766 A * | 3/1987 | Wollar | ............................ | 411/41 |
| 4,861,208 A * | 8/1989 | Boundy | ............................ | 411/339 |
| 5,507,610 A * | 4/1996 | Benedetti et al. | ............. | 411/339 |
| 5,775,860 A | 7/1998 | Meyer | | |
| 6,003,928 A | 12/1999 | Curtindale | | |
| 6,196,607 B1 * | 3/2001 | Gulisano | ....................... | 296/39.1 |
| 6,196,756 B1 * | 3/2001 | Leverger | ....................... | 403/326 |
| 6,264,393 B1 * | 7/2001 | Kraus | ............................ | 403/282 |
| 6,594,870 B1 * | 7/2003 | Lambrecht et al. | ............. | 24/297 |
| 6,612,795 B2 * | 9/2003 | Kirchen | ........................ | 411/508 |
| 6,769,849 B2 * | 8/2004 | Yoneoka | ........................ | 411/45 |
| 6,874,983 B2 * | 4/2005 | Moerke et al. | .................... | 411/46 |
| 7,178,855 B2 * | 2/2007 | Catron et al. | ............. | 296/146.7 |
| 7,198,315 B2 * | 4/2007 | Cass et al. | ........................ | 296/29 |
| 7,351,023 B2 * | 4/2008 | Scroggie et al. | ............. | 411/508 |
| 7,549,199 B2 * | 6/2009 | Bugner | ............................ | 24/297 |
| 7,559,599 B2 * | 7/2009 | Kaplanov et al. | .......... | 296/146.7 |
| 7,614,836 B2 * | 11/2009 | Mohiuddin et al. | .......... | 411/510 |
| 7,677,850 B2 * | 3/2010 | Sano | ............................... | 411/45 |
| 7,690,876 B2 * | 4/2010 | Kawai et al. | .................... | 411/45 |
| 2002/0021950 A1 * | 2/2002 | Ichikawa | ....................... | 411/349 |
| 2003/0190965 A1 * | 10/2003 | Kirchen et al. | .................... | 470/2 |
| 2004/0074056 A1 * | 4/2004 | Gotzinger et al. | ............. | 24/289 |
| 2005/0023686 A1 | 2/2005 | Lin | | |
| 2006/0197356 A1 * | 9/2006 | Catron et al. | ............. | 296/146.7 |

(Continued)

FOREIGN PATENT DOCUMENTS

WO 2010016982 2/2010

OTHER PUBLICATIONS

Removable U-Type Cable Clips found at http://www.jetpress.com/Products.aspx/14249/CableAndPipeClips/UType/.

*Primary Examiner* — Robert J Sandy
*Assistant Examiner* — David Upchurch
(74) *Attorney, Agent, or Firm* — Vichit Chea; Price Heneveld LLP

(57) ABSTRACT

A serviceable safety clip for retaining an automotive trim panel to an inner panel. The serviceable safety clip includes a pin secured to the trim panel, wherein the pin includes a plurality of blades that each include a low retention detent and a high retention detent. The serviceable safety clip also includes a receiver that is secured to the inner panel, wherein the receiver includes an angled face to facilitate insertion of the pin detents and a holding face that retains the pin detents.

20 Claims, 4 Drawing Sheets

(56) References Cited

U.S. PATENT DOCUMENTS

| | | | |
|---|---|---|---|
| 2008/0014045 A1* | 1/2008 | Kawai | 411/45 |
| 2008/0028577 A1* | 2/2008 | Soman et al. | 24/293 |
| 2008/0066266 A1* | 3/2008 | Scroggie et al. | 24/297 |
| 2010/0072735 A1* | 3/2010 | Kirchen et al. | 280/728.2 |

* cited by examiner

TWO STAGE SERVICEABLE SAFETY CLIP

FIELD OF THE INVENTION

The present invention generally relates to a trim panel attachment assembly, and more particularly relates to a two stage safety clip.

BACKGROUND OF THE INVENTION

Automotive vehicles typically include decorative trim panel pieces secured to inner panels in a variety of ways. Such trim panels must meet installation and removal standards for service, while also meeting standards pertaining to retention in the event of an impact. Often, screws or other mechanical fasteners are employed to secure the trim panel to the inner panel, however, visible screws or fasteners are not desirable from an aesthetics standpoint. Other trim panels are secured to the inner panel by hidden fasteners, however, these do not ensure retention forces sufficient to completely retain the trim panel in the event of an impact.

Accordingly, an apparatus is desired having the aforementioned advantages and solving and/or making improvements on the aforementioned disadvantages.

SUMMARY OF THE INVENTION

A first disclosed embodiment is a serviceable safety clip for retaining an automotive trim panel to an inner panel. The serviceable safety clip includes a pin secured to the trim panel, wherein the pin includes a plurality of blades that each include a low retention detent and a high retention detent. The serviceable safety clip also includes a receiver that is secured to the inner panel, wherein the receiver includes an angled face to facilitate insertion of the pin detents and a holding face that retains the pin detents.

In another disclosed embodiment, a serviceable safety clip for retaining an automotive trim panel to an inner panel is provided. The serviceable safety clip includes a pin secured to the trim panel, wherein the pin includes at least one blade. The at least one blade includes a first end and a second end, as well as a high retention detent that includes a first angled face portion located proximate the first end of the at least one blade and a first dropoff face proximate an end point of the first angled face portion. The blade further includes a low retention detent that includes a second angled face portion and a second dropoff face, wherein the low retention detent is located between the first dropoff face and the second end of the at least one blade. The serviceable safety clip also includes a receiver secured to the inner panel, wherein the receiver includes an angled face to facilitate insertion of the pin detents and a holding face that retains the first and second dropoff faces of the pin detents.

In another disclosed embodiment, a method for retaining an automotive trim panel to an inner panel is provided. The method includes providing a pin secured to the trim panel, wherein the pin includes at least one blade comprising a first end and a second end, a high retention detent that includes a first angled face portion located proximate the first end of the at least one blade and a first dropoff face proximate an end point of the first angled face portion, a low retention detent that includes a second angled face portion and a second dropoff face, wherein the low retention detent is located between the first dropoff face and the second end of the at least one blade, and a receiver secured to the inner panel, wherein the receiver includes an angled face and a holding face. The method also includes inserting the first end of the at least one blade into the receiver, wherein the first angled face portion of the high retention detent slides along the angled face of the receiver and over the holding face of the receiver. The method further includes pushing the pin into the receiver further, wherein the second angled face portion of the low retention detent slides along the angled face of the receiver and over the holding face of the receiver.

These and other aspects, objects, and features of the present invention will be understood and appreciated by those skilled in the art upon studying the following specification, claims, and appended drawings.

DETAILED DESCRIPTION OF PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
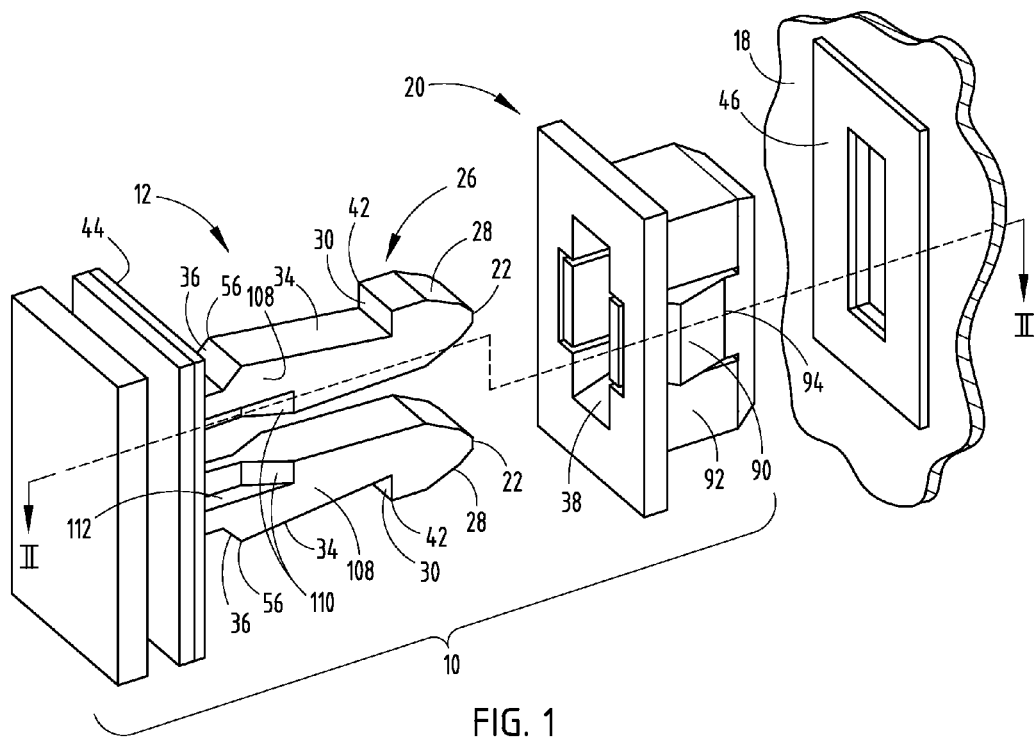
FIG. 1 is a top, left perspective view of a serviceable safety clip for retaining an automotive trim panel to an inner panel.
Figure 1A:
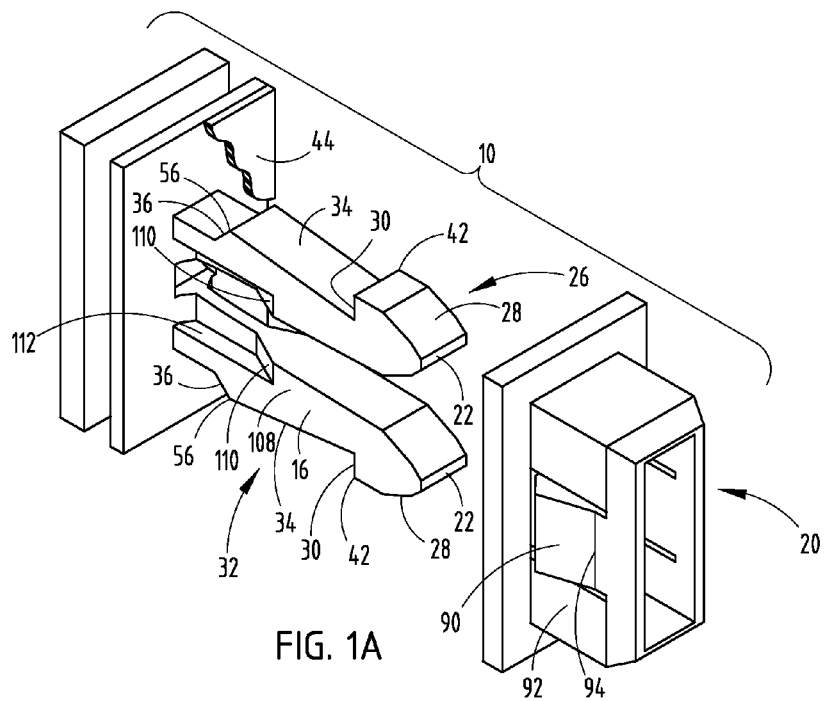
FIG. 1A is a top, right perspective view of the serviceable safety clip for retaining the automotive trim panel to the inner panel.
Figure 2:
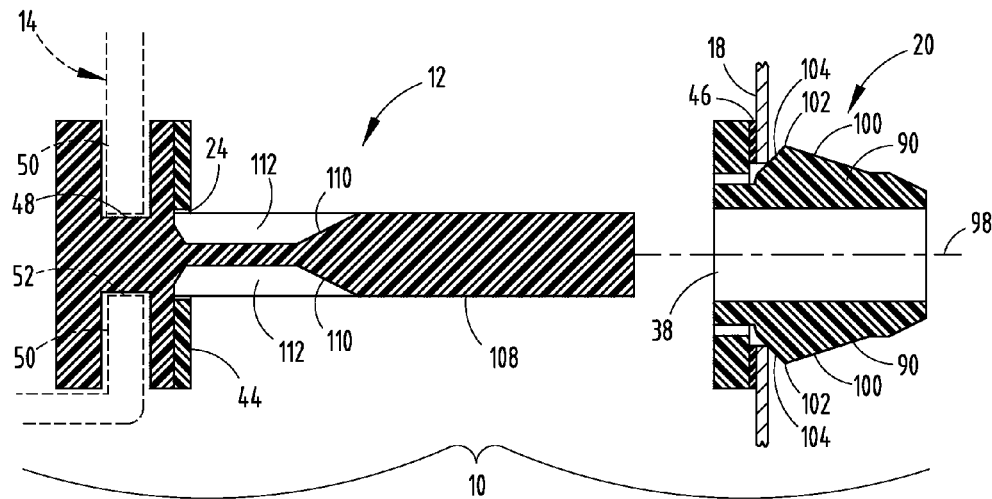
FIG. 2 is a top, cross-sectional view of the serviceable safety clip taken along line 2-2 of FIG. 1.
Figure 3:
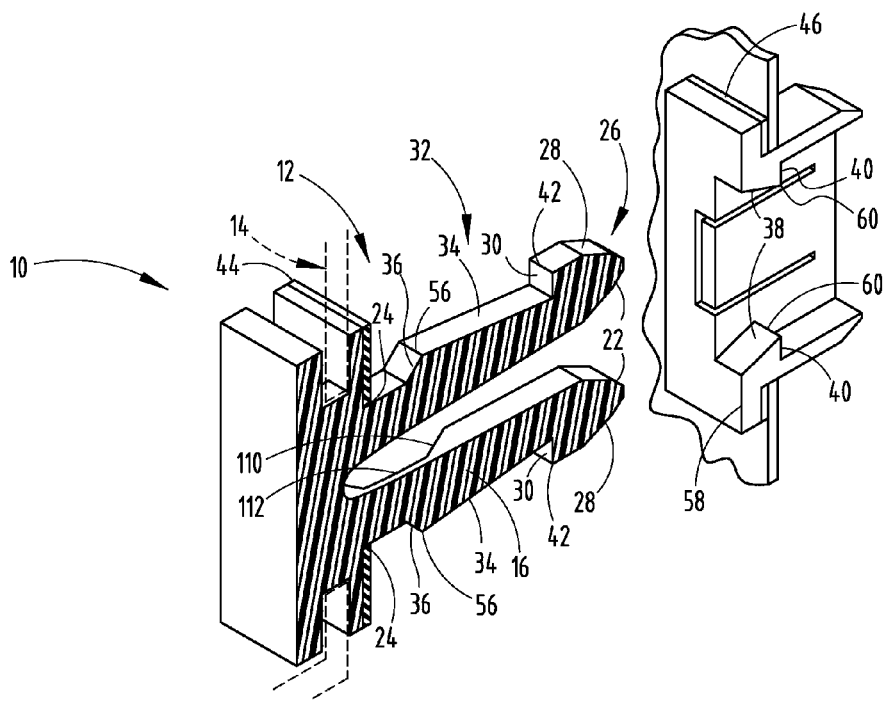
FIG. 3 is a perspective, cross-sectional view of the serviceable safety clip.

The reference numeral 10 (FIGS. 1-3) generally designates a two stage serviceable safety clip for retaining an automotive trim panel 14 to an inner panel 18, such as an automotive door panel. In the illustrated example, the two stage serviceable safety clip 10 comprises a pin 12 secured to the trim panel 14, where the pin 12 includes at least one blade 16. Each blade 16 comprises a first end 22 and a second end 24. Each blade 16 also comprises a high retention detent 26 that includes a first angled face portion 28 located proximate the first end 22 of the blade 16 and a first dropoff face 30 proximate an end point 42 of the angled face portion 28. Each blade 16 also comprises a low retention detent 32 that includes a second angled face portion 34 and a second dropoff face 36, where the low retention detent 32 is located between the first dropoff face 30 and the second end 24 of the blade 16. The serviceable safety clip 10 also comprises a receiver 20 secured to the inner panel 18, where the receiver 20 includes an angled face 38 to facilitate insertion of the pin detents 26, 32 and a holding face 40 that retains the first and second dropoff faces 30, 36 of the pin detents 26, 32.

The illustrated serviceable safety clip assembly 10 may be a molded plastic clip comprising two main parts, specifically the two stage pin 12 and the receiver 20. The pin 12 includes at least one blade 16, and typically two blades 16, that extend substantially parallel to one another in a longitudinal direction. The pin 12 also includes a base section 48 from which the blades 16 extend in a substantially perpendicular direction. The base 48 is configured to securely attach to the trim panel piece 14 in any number of ways. In the illustrated examples shown in FIGS. 1-3, the trim panel piece 14 includes a dog house portion 50 that may be snap-fitted into slots 52 of the molded pin 12. Alternatively, the secure attachment between the trim panel piece and the pin 12 may be accomplished by employing mechanical fasteners or an adhesive.

The blades 16 of the pin 12 include a first end 22 located at the distal end of the base 48. The blades 16 terminate at a second end 24 located adjacent to the base 48. The high retention detent 26 of each blade 16 is located proximate the first end 22 of each blade 16 and comprises a first angled face portion 28 and a first dropoff face 30. The first angled face portion 28 begins at the first end 22 and extends either linearly or in a slightly curved manner away from the first end 22 toward the second end 24 of the blade 16, while also extending outwardly away from an imaginary longitudinal centerline 54. The first angled face portion 28 terminates at an end point 42, then transitions into the first dropoff face 30. The first dropoff face 30 extends from the end point 42 at a steep angle substantially perpendicular to, and toward, the longitudinal centerline 54.

Additionally, each blade 16 includes a necked region proximate the second end 24. Tapering inward from a sidewall 108 of the blade 16 is an angled face 110 that forms a channel 112.

Each blade 16 also includes a low retention detent 32 located at a position between the first dropoff face 30 and the second end 24 of each blade 16. The low retention detent 32 includes a second angled face portion 34 that extends either linearly or in a slightly curved manner away from the first end 22 and toward the second end 24, while also extending outwardly from the longitudinal centerline 54. The second angled face portion 34 may have a similar configuration and/or angle incline as that of the first angled face portion 28. Alternatively, the second angled face portion 34 may take on a distinct geometric configuration and/or angle of incline as that of the first angled face portion 28. The second angled face portion terminates at a point 56, thereby transitioning into a second dropoff face 36. The second dropoff face 36 extends from point 56 inwardly towards the longitudinal centerline 54 and towards the second end 24 of the blade 16. The angle of the second dropoff face 36 is not as steep as that of the first dropoff face 30. Each blade 16 is flexibly biased to maintain an at rest position, that being substantially parallel to the other blades 16, as well as substantially perpendicular to the base 48 of the pin 12.

The receiver 20 of the overall clip assembly 10 is installed into a sheet metal hole of the inner panel 18. The receiver 20 includes at least one, but typically a plurality of flexible fins 90 that are located proximate sidewalls 92 of the receiver 20. The flexible fins 90 are flexibly hinged at point 94 to the receiver 20. A corresponding void 96 in the receiver 20 allows the flexible fins 90 to rotate or flex inwardly towards a longitudinal centerline 98 of the receiver 20. Each flexible fin 90 includes a first angled face 100 that extends from the point 94 where the flexible fin 90 is hingeably attached and terminates at point 102, while also extending radially outward from the longitudinal centerline 98 of the receiver 20. At point 102, the first angled face 100 transitions to a second angled face 104. The second angled face 104 extends from the point 102 radially inward toward the longitudinal centerline 98 of the receiver 20. In the illustrated example, both the first and second angled faces 100,104 comprise substantially linear paths, however, the first and second angled faces 100, 104 may comprise a slightly curved geometry. The second angled face 104 terminates proximate seal 46 and it is this small space between the flexible fin 90 and the seal 46 that the inner panel 18 will reside between when the assembly 10 is fully inserted into an aperture of the inner panel 18.

After the assembly 10 initially penetrates the inner panel 18, the flexible fins 90 eventually engage the inner panel 18. Specifically, the inner panel 18 engages the first angled face 100 of the flexible fin 90, thereby depressing each fin 90 into the corresponding channel 112 of the pin blade 16 by rotating each fin 90 about hinge point 94. Further insertion of the assembly 10 continues the process of the inner panel 18 gliding along the first angled face 100 of the flexible fin 90 until the flexible fin 90 bypasses the aperture of the inner panel 18. Full insertion of the assembly 10 is reached when the seal 46 engages the receiver 20, as well as when the flexible fins 90 rotate outwardly away from the longitudinal centerline 98. The outward flexing of the fins 90 occurs due to a biasing force that is applied approximate hinge point 94.

In the position where the receiver 20 is fully inserted into the inner panel 18 (FIG. 2), the inner panel 18 is engaged, or very nearly in contact with, the second angled face 104 of the flexible fin 90. In this fully inserted position, the trim panel 14 is securely engaged to the inner panel 18 and this constitutes a static position. From this static position, the trim panel 14 may optionally be removed from the inner panel 18 for service or replacement. To accomplish removal, sufficient force must be applied to withdraw the assembly 10, specifically overcoming the hinge force of the flexible fins 90. Sufficient pulling force will cause the inner panel 18 to slide along the second angled face 104, thereby depressing each fin 90 into the corresponding channel 112 until the assembly 10 may be fully withdrawn.

The receiver 20 includes an exterior face 58 that may be exposed to an exterior region of the inner panel 18. The receiver 20 also includes an angled face 38 that extends from the exterior face 58 into the interior region of the inner panel 18, as well as inwardly toward the longitudinal centerline 54. The angled face 38 terminates at a point 60 and transitions into a holding face 40 that extends outwardly from the longitudinal centerline 54 in a substantially perpendicular direction.

Although the illustrated drawings depict the pin 12 being inserted into the receiver 20 subsequent to insertion of the receiver 20 into the inner panel 18, it is also conceived that the pin 12 would be inserted into the receiver 20 prior to insertion of the then assembled two stage serviceable safety clip 10 into the inner panel 18. A single unit installation step such as this would be advantageous to installation operators who are accustomed to installing a single unit.

Figure 4:
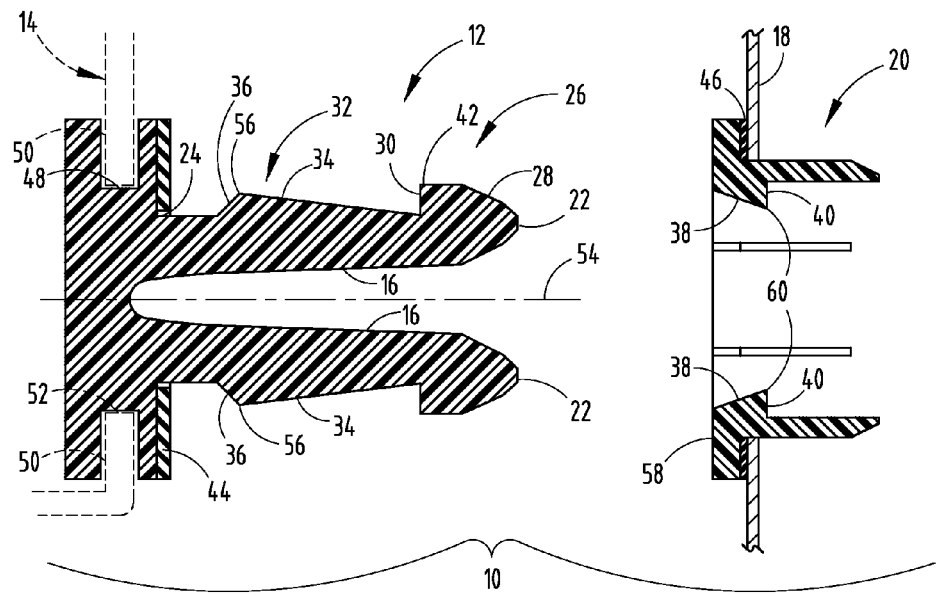
FIG. 4 is a front, cross-sectional view of the serviceable safety clip.
Figure 5:
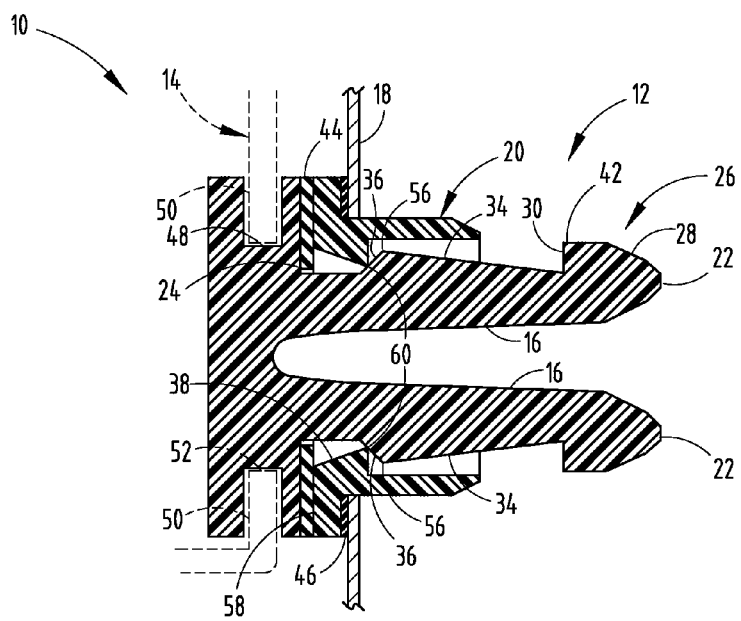
FIG. 5 is a front, cross-sectional view of the serviceable safety clip fully inserted into an aperture of an inner panel.

Full insertion (FIG. 4) of the pin 12 into the receiver 20 is facilitated by the cooperation of the first angled face and the second angled face portions 28, 34 with the angled face 38 of the receiver 20. The angles allow a smooth insertion of the pin 12 into the receiver 20, thereby bringing the trim panel piece 14 into a position proximate the inner panel 18. Foam seals 44, 46 are included on one or both the receiver 20 and the pin 12 to achieve sealing between the relevant components. In the illustrated example, the second dropoff face 36 of the low retention detent 32 provides a resistive force to extraction of the pin 12 from the receiver 20. The exact angle and configuration of the low retention detent 32 may be optimized to provide various retention forces. The retention force prevents withdrawal of the pin 12 from the receiver 20 to counteract forces that would otherwise dislodge the pin 12 from the receiver 20. One example of such an external force is an automobile collision. In the event an external force overcomes the retention force provided by the low retention detent 32, the high retention detent 26 is provided to ensure that the pin 12 is not completely removed from the receiver 20. This is successfully accomplished by the steep angle of the first dropoff face 30 and the holding face 40, as well as each blade 16 being flexibly biased to maintain a position substantially parallel to one another. By negating relatively easy flexure of the blades 16, the pin 12 cannot be completely withdrawn from the receiver 20 based on the first dropoff face 30 engaging the holding face 40 of the receiver 20. This position is illustrated in FIG. 5.

To avoid withdrawal of the receiver 20, and thereby the trim panel 14, when undergoing a significant external force such as an automobile collision, the assembly 10 is capable of transitioning to an impact position. The impact position is defined by a repositioning of the pin 12 to a position where the pin 12 overcomes the low retention detent 32 and slides to a position where the sidewalls 108 block inward flexing of the fins 90, thereby preventing the receiver 20 from pulling away from the inner panel 18. By blocking the ability of the fins 20 to rotate, the overall pin assembly 10 is effectively locked in place, thereby preventing the pin assembly 10 and trim panel 14 from disengaging the inner panel 18.

Figure 6:
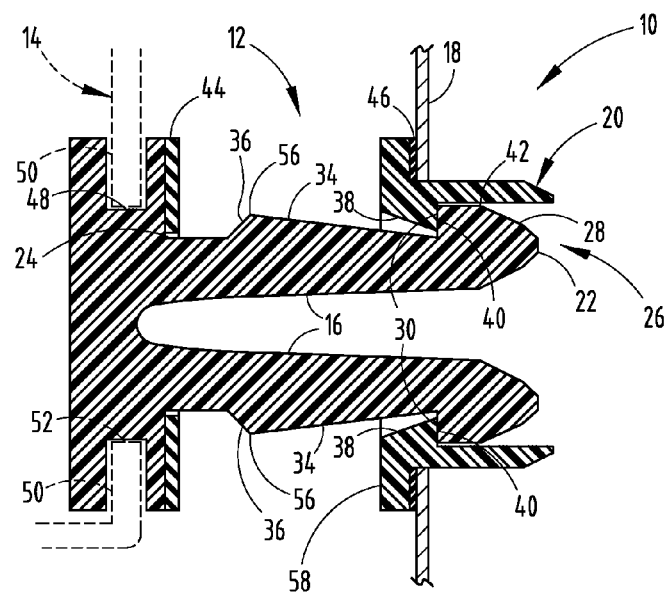
FIG. 6 is a front, cross-sectional view of the serviceable safety clip partially inserted into the inner panel.
Figure 7:
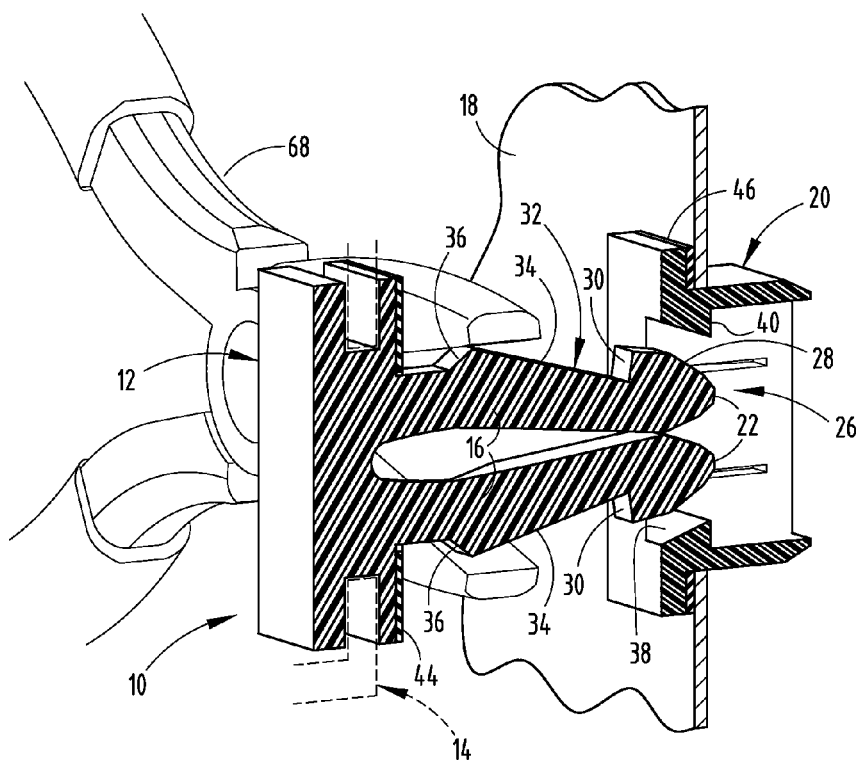
FIG. 7 is a perspective, cross-sectional view of the serviceable safety clip being removed from the inner panel.

In the event the trim panel piece 14 or the inner panel 18 require service, the pin 12, and thereby the trim panel piece 14, may be completely withdrawn from the receiver 20 (FIG. 6). By manually pulling the pin 12 away from the receiver 20, with sufficient force to overcome the low retention detent 32, a space between the base 48 of the pin 12 and the inner panel 18 is created. Within this space, either fingers or a tool 68 may be inserted to clamp down with sufficient force to overcome the flexible biasing of the blades 16. Clamping down with such a force deflects the blades 16 inwardly toward the longitudinal centerline 54, thereby disengaging the first dropoff face 30 and the holding face 40 which allows the pin 12 to be withdrawn from the receiver 20.

It addition to having the ability to withdraw the pin 12 from the receiver 20, the receiver 20 may be withdrawn from the inner panel 18 by simply pulling the receiver 20 away from the inner panel 18 when the fins 90 are not impeded from flexing inward. This is possible when the pin 12 is withdrawn from the receiver 20 or when the pin 12 is in the static position, that being when the channel 12 is lined up to receive inwardly flexing fins 90 during withdrawal of the receiver 20.

It is to be understood that variations and modifications can be made on the aforementioned structure without departing from the concepts of the present invention, and further it is to be understood that such concepts are intended to be covered by the following claims unless these claims by their language expressly state otherwise.

I claim:

1. A serviceable safety clip for retaining an automotive trim panel to an inner panel comprising:
    a pin secured to the trim panel and including a plurality of blades on opposing sides of a gap that each include high and low retention detents; and
    a receiver that is secured to the inner panel and includes an angled face to flex the blades into the gap and a holding face that retains the pin detents.

2. The serviceable safety clip for retaining an automotive trim panel to an inner panel of claim 1, wherein the plurality of blades each include a first end and a second end, and wherein the blades extend substantially parallel to each other.

3. The serviceable safety clip for retaining an automotive trim panel to an inner panel of claim 2, wherein the plurality of blades are flexibly biased proximate the second end of each blade.

4. The serviceable safety clip for retaining an automotive trim panel to an inner panel of claim 3, wherein the plurality of blades are made of a plastic material.

5. The serviceable safety clip for retaining an automotive trim panel to an inner panel of claim 3, wherein the pin includes at least one foam seal proximate the second ends of the plurality of blades.

6. The serviceable safety clip for retaining an automotive trim panel to an inner panel of claim 3, further comprising at least one foam seal proximate the receiver.

7. The serviceable safety clip for retaining an automotive trim panel to an inner panel of claim 3, wherein the each of the high retention detents include a first angled face portion located proximate the first ends of the at blades and a first dropoff face proximate an end point of the angled face portion.

8. The serviceable safety clip for retaining an automotive trim panel to an inner panel of claim 3, wherein each of the low retention detents include a second angled face portion and a second dropoff face, wherein each of the low retention detents are located between the first dropoff face and the second ends of the blades.

9. The serviceable safety clip for retaining an automotive trim panel to an inner panel of claim 8, wherein the angled face of the receiver and the first dropoff face of the high retention detent are aligned substantially perpendicular to a longitudinal direction of the substantially parallel blades.

10. A serviceable safety clip for retaining an automotive trim panel to an inner panel comprising:
    a pin secured to the trim panel, wherein the pin includes a plurality of separate blades, further comprising:
        a first end and a second end;
        a high retention detent that includes a first angled face portion located proximate the first end of each of the plurality of separate blades and a first dropoff face proximate an end point of the first angled face portion;
        a low retention detent that includes a second angled face portion and a second dropoff face, wherein the low retention detent is located between the first dropoff face and the second end of each of each of the plurality of separate blades; and
    a receiver secured to the inner panel, wherein the receiver includes an angled face
    to facilitate flexing the plurality of separate blades toward each other upon insertion of the pin detents and a holding face that retains the first and second dropoff faces of the pin detents.

11. The serviceable safety clip for retaining an automotive trim panel to an inner panel of claim 10, wherein the pin includes a plurality of blades.

12. The serviceable safety clip for retaining an automotive trim panel to an inner panel of claim 11, wherein the blades extend substantially parallel to each other.

13. The serviceable safety clip for retaining an automotive trim panel to an inner panel of claim 12, wherein the blades are flexibly biased proximate the second end of each blade.

14. The serviceable safety clip for retaining an automotive trim panel to an inner panel of claim 13, wherein the blades are made of a plastic material.

15. The serviceable safety clip for retaining an automotive trim panel to an inner panel of claim 13, wherein the pin includes at least one foam seal proximate the second ends of the plurality of blades.

16. The serviceable safety clip for retaining an automotive trim panel to an inner panel of claim 13, further comprising at least one foam seal proximate the receiver.

17. The serviceable safety clip for retaining an automotive trim panel to an inner panel of claim 13, wherein the angled face of the receiver and the first dropoff face of the high retention detent are aligned substantially perpendicular to a longitudinal direction of the substantially parallel blades.

18. A clip for retaining an automotive trim panel to an inner panel comprising:
   a pin having a head secured to the trim panel and a plurality of blades extending from the head and each including high and low retention detents; and
   a receiver secured to the inner panel and having a holding face that retains the high retention detent after the blades separately flex inward to dislodge the low retention detent from the holding face.

19. The clip of claim 18, wherein the plurality of blades are flexible proximate the head to allow the blades to flex inward toward each other for the high and low retention detents to overcome the holding face.

20. The clip of claim 18, wherein the low retention detent include a second dropoff face and the high retention detent includes a first dropoff face with a steeper angle from the blade than the second dropoff face.

\* \* \* \* \*